(12) United States Patent
Sims

(10) Patent No.: US 6,725,874 B1
(45) Date of Patent: Apr. 27, 2004

(54) DELAYED TRIPLE PRESSURE FLOW VALVE

(76) Inventor: James O. Sims, P.O. Box 1209, Decatur, AL (US) 35602

( * ) Notice: Subject to any disclaimer, the term of this patent is extended or adjusted under 35 U.S.C. 154(b) by 0 days.

(21) Appl. No.: 09/956,396

(22) Filed: Jan. 24, 2002

Related U.S. Application Data

(63) Continuation-in-part of application No. 09/524,784, filed on Mar. 13, 2000, now abandoned.

(51) Int. Cl.$^7$ .............................................. G05D 11/03
(52) U.S. Cl. ................... 137/118.06; 137/601.2
(58) Field of Search ................... 137/118.06, 601.2, 137/879, 512.2

(56) References Cited

U.S. PATENT DOCUMENTS

| | | | | | |
|---|---|---|---|---|---|
| 3,506,312 A | * | 4/1970 | Siddall | ................ | 137/599.11 |
| 4,556,078 A | * | 12/1985 | Wittren | ................ | 137/118.06 |
| 4,691,795 A | * | 9/1987 | Wehmeyer et al. | ......... | 137/884 |
| 6,012,287 A | * | 1/2000 | Sims | ........................ | 60/560 |

* cited by examiner

Primary Examiner—Stephen M. Hepperle
(74) Attorney, Agent, or Firm—Joseph H. Beumer

(57) ABSTRACT

A delayed triple pressure flow valve for controlling the hydraulic fluid passing to two work stations.

9 Claims, 4 Drawing Sheets

DELAYED TRIPLE PRESSURE FLOW VALVE

This is a continuation-in-part of U.S. patent application Ser. No. 09/524,784 filed Mar. 13, 2000, now abandoned.

FIELD OF THE INVENTION

The present invention relates generally to fluid pressure responsive valves. More specifically, the invention is an adjustable triple pressure flow valve for supplying hydraulic fluid under pressure to two work stations.

DESCRIPTION OF THE RELATED ART

The related art of interest describes air and hydraulic valve systems for various installations, but none discloses the present invention. There is a need for an efficient and economical system for permitting the control of hydraulic fluid to two power stations in sequence and preventing backflow for excessive pressure with a switch block. The related art will be discussed in the order of perceived relevance to the present invention.

U.S. Pat. No. 4,561,700 issued on Dec. 31, 1985, to Bernd Goritz et al. describes a selector valve for pressure control device in a railway vehicle air brake system comprising a triple pressure control valve 3, a balancing selector valve 17, a maximum pressure control valve 12, a monitoring valve 6, a retention valve 38, and a check valve 8 in the main brake pipeline. The triple pressure control valve 3 has an air supple chamber 14 with a spring loaded valve device 13 in its upper portion. The lower portion is a constant pressure chamber 5 comprising a control chamber 2 motivated by another spring. An air supply tank is apparently connected to the constant pressure chamber. The monitoring valve 6 controls the filling of the constant pressure chamber by a filling stroke protective device 7. The triple pressure control valve is distinguishable for being based on an air pressure system, its different control piston structure, and the requirement for a balancing selector valve 17 with its piston and retention valve 38.

U.S. Pat. No. 3,148,364 issued on Sep. 8, 1964, to Walter Engels et al. describes a safety air device for fluid pressure operated brake systems comprising a symmetrical housing with identical housing sections 10, 11 containing a rod 29 held by a separator plate 14 having rubber diaphragms 37. The ends of the rod 29 engage tubular seats 22 and compressible coil springs 36 in the tubular chambers of the combined valve seat and outlet heads 19. The device is distinguishable for its dual structure incorporating a single rod element.

U.S. Pat. No. 3,817,266 issued on Jun. 18, 1974, to Richard W. Dymond describes a hydraulic system with flow control means to control pressure distribution between a primary and secondary hydraulic circuit comprising a boss formed on a pump housing and covered by sheet form cap to include an inlet hydraulic fluid reservoir. The boss includes a flow control valve or regulator comprising a valve spool having a valve head, a throat and a body portion connected to a compression spring. A primary hydraulic fluid circuit and a secondary hydraulic fluid circuit are connect to the top of the sheet form cap for the control of fluid flow to these circuits by movement of the valve spool. The main control valve device is distinguishable for being limited to a single valve controlling two circuits.

U.S. Pat. No. 2,601,849 issued on Jul. 1, 1952, to Leighton Lee, II describes an apparatus for distributing equal quantities of comprising in series, attached to a tank and a pump, a discharge valve having a spring operated valve and two control valves having pistons on guide rods operating discharge valves. A relief valve is inserted across the discharge valve and the pump to receive a variable control fluid feeding the piston valve and bellows in the discharge valve. The three valves in series are interconnected with a pilot conduit as well as the main discharge conduit coming from the pump and containing metering orifices in the branch conduits. The apparatus is distinguishable for requiring a relief valve, an interconnected discharge valve and two control valves.

U.S. Pat. No. 3,806,037 issued on Apr. 23, 1974, to Gunter A. K. Loewenkamp describes a selective fluid discharge system and control valve means for supplying to a discharge control nozzle a primary fluid (water) and a fluid intermix (detergent) which includes the primary fluid. A first control valve is interposed between a pressurized source of water and the discharge nozzle, and is responsive to a predetermined change in fluid pressure at the discharge nozzle due to opening and closing of the nozzle to control a second valve which effects an alternate supply to the discharge nozzle of the detergent solution. The system is distinguishable for its alternate supply mode.

U.S. Pat. No. 4,170,279 issued on Oct. 9, 1979, to Claude Pelletier describes a fluid flow control device suitable for controlling the flow of hydraulic fluid between two chambers of a jack comprising a valve between each of two chambers between controlled and a common chamber. The valves are controlled by pilot operated stops which, when retracted, permit the valves to close fully, but which, when extended hold the valves partially open. The device is distinguishable for its side-by-side dual valve structure.

U.S. Pat. No. 5,706,785 issued on Jan. 13, 1998, to Bernhard Radermacher et al. describes a fuel supply system for internal combustion systems comprising a pressure regulator which returns excessive fuel to the fuel tank. The pressure regulator contains an upper fuel chamber and a lower chamber with a spring biased lifter element of a pressure control valve to open for a large fuel volume and to close for a small fuel volume. Two check valves are included in opposite fuel lines connected by a branch line. The pressure regulator is distinguishable for its structure based on the regulation of volatile fuel flow.

None of the above inventions and patents, taken either singularly or in combination, is seen to describe the instant invention as claimed. Thus a delayed triple pressure flow valve solving the aforementioned problems is desired.

SUMMARY OF THE INVENTION

The present invention is directed to a delayed triple pressure flow valve device system. The delayed triple pressure valve device is a block valve for controlling the hydraulic fluid passing to two work stations. When the pressure at the first work station exceeds a predetermined pressure in the delayed triple pressure flow valve, a first ball valve opens a conduit to a second work station. Once the pressure reaches a second predetermined pressure, a second ball valve opens to relieve the pressure from both work stations. The bell-shaped valve controls backflow when the total hydraulic pressure is exceeded in the delayed triple pressure flow valve device. Both devices are made of aluminum blocks with the conduits drilled and tapped.

Accordingly, it is a principal object of the invention to provide a delayed triple pressure flow valve device.

It is another object of the invention to provide a hydraulic control system for two work stations.

It is a further object of the invention to provide a delayed triple pressure flow valve device from a metal block which permits excessive pressure from a first work station to bleed to a second work station.

Still another object of the invention is to provide an upstream bell-shaped block device to control backflow from the delayed triple pressure flow valve device in the hydraulic system.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 shows similar reference characters denote corresponding features consistently throughout the attached drawings.

The first work station is shown as receiving fluid through the flow valve to the work station.

Figure 1:
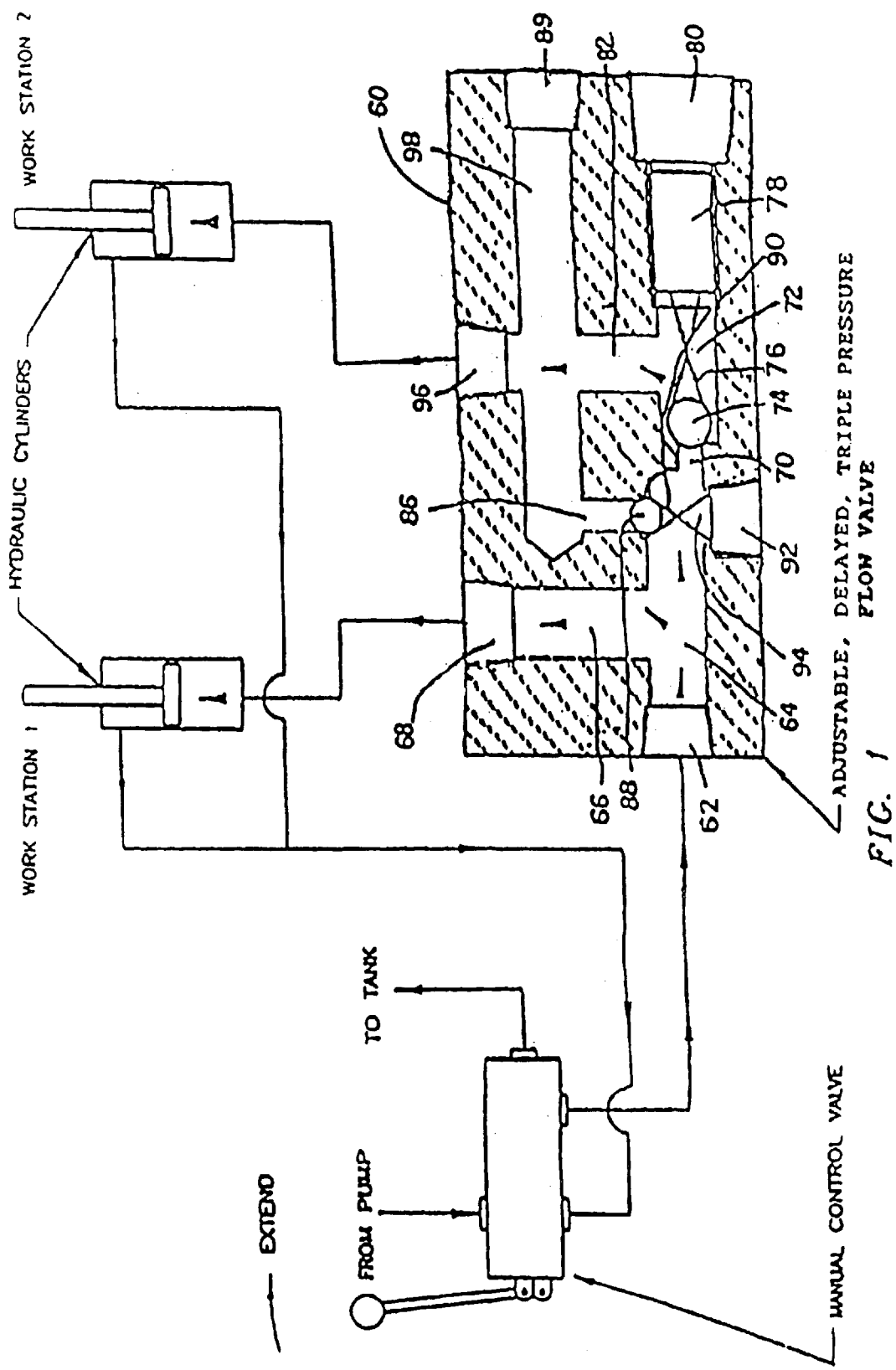
FIG. 1 is a schematic sectional top plan view of a delayed triple pressure flow valve device according to the present invention. The valve shows a pair of pistons and cylinders as the work station.
Figure 2:
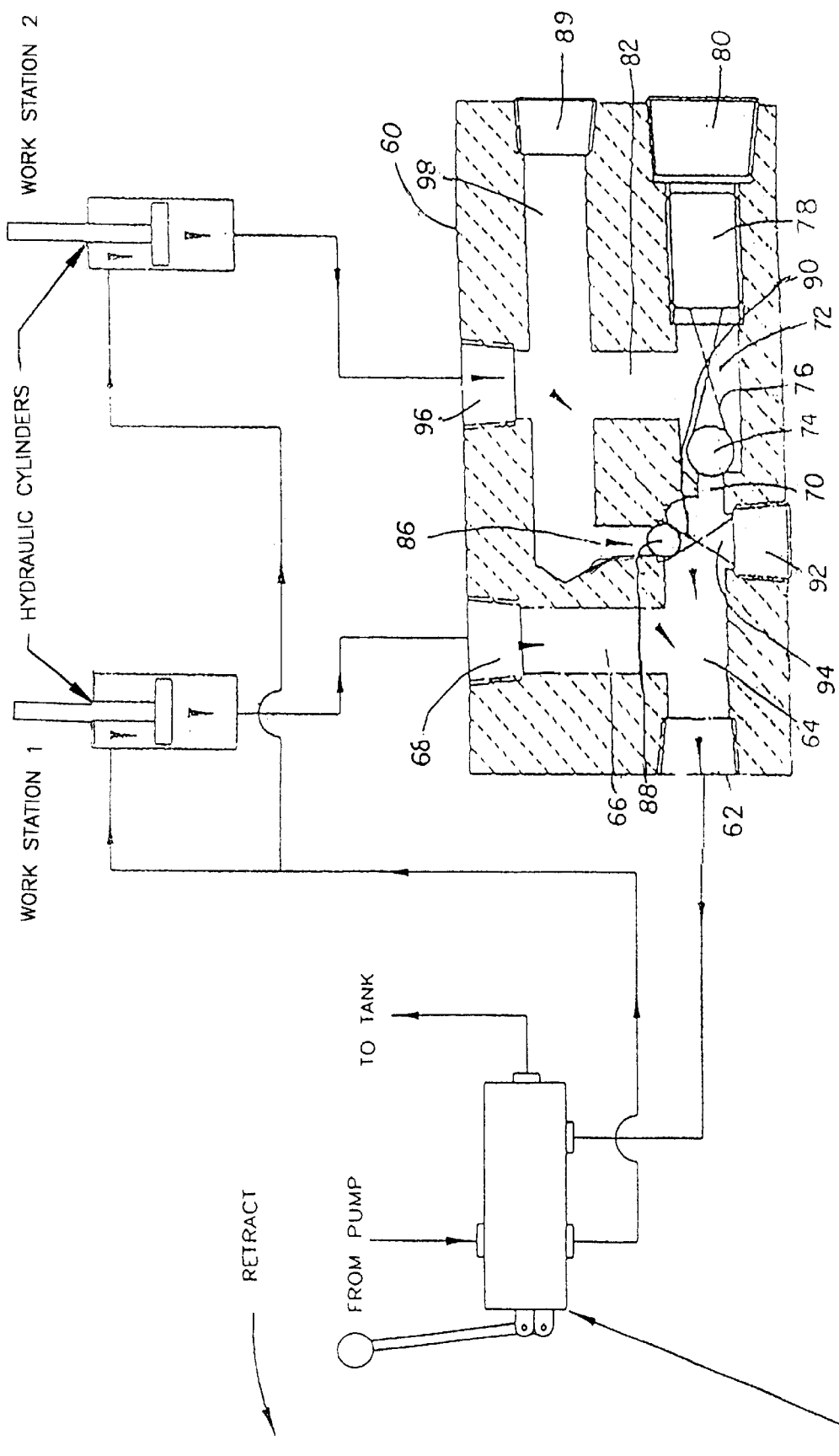

FIG. 2 is a view similar to FIG. 1 but shows the fluid flow returning fluid from the work station back through the flow valve.

Figure 3:
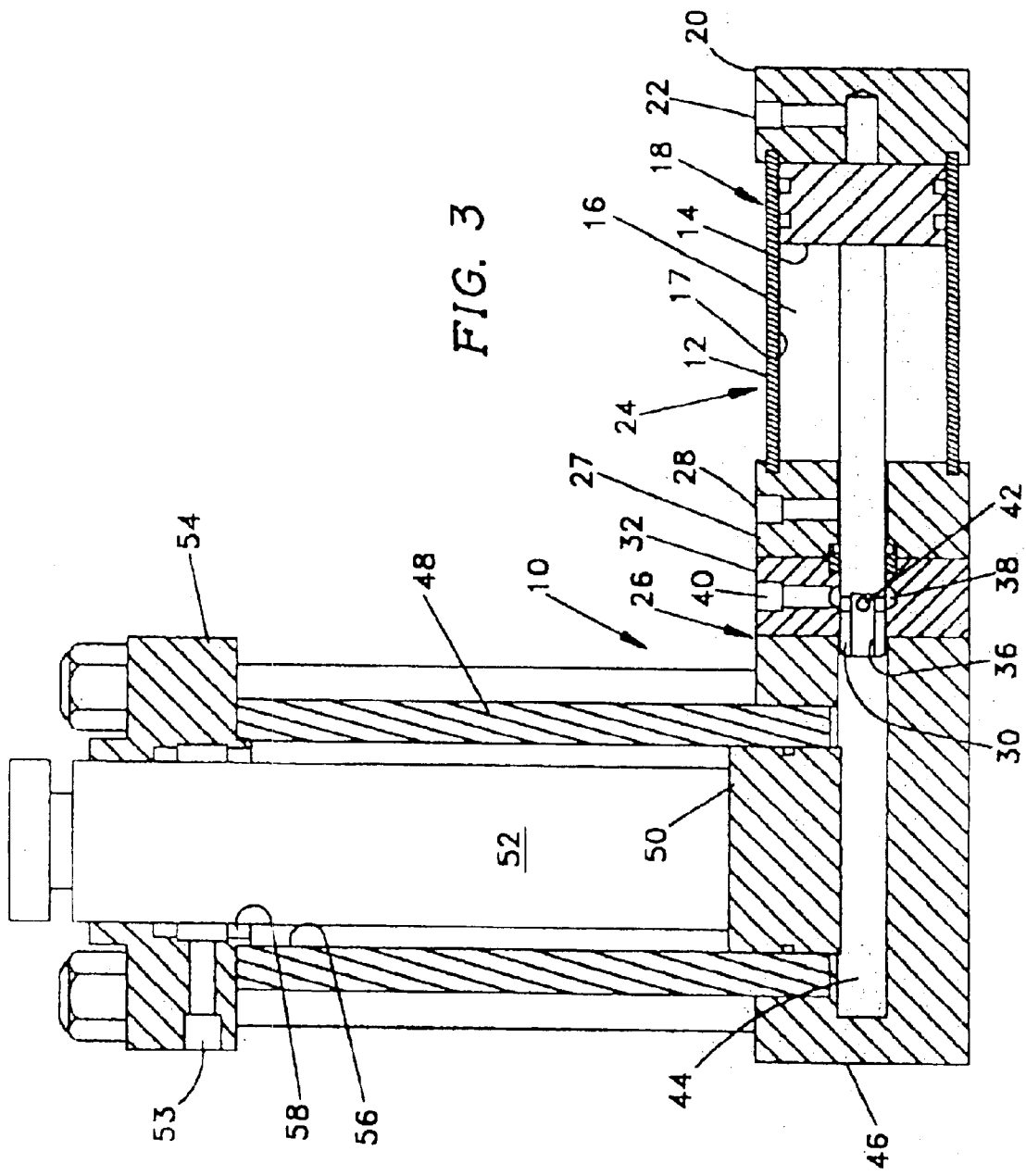

FIG. 3 is an elevational, sectional view of a fluid actuator for a two work station system for which the present invention is applicable.

Figure 4:
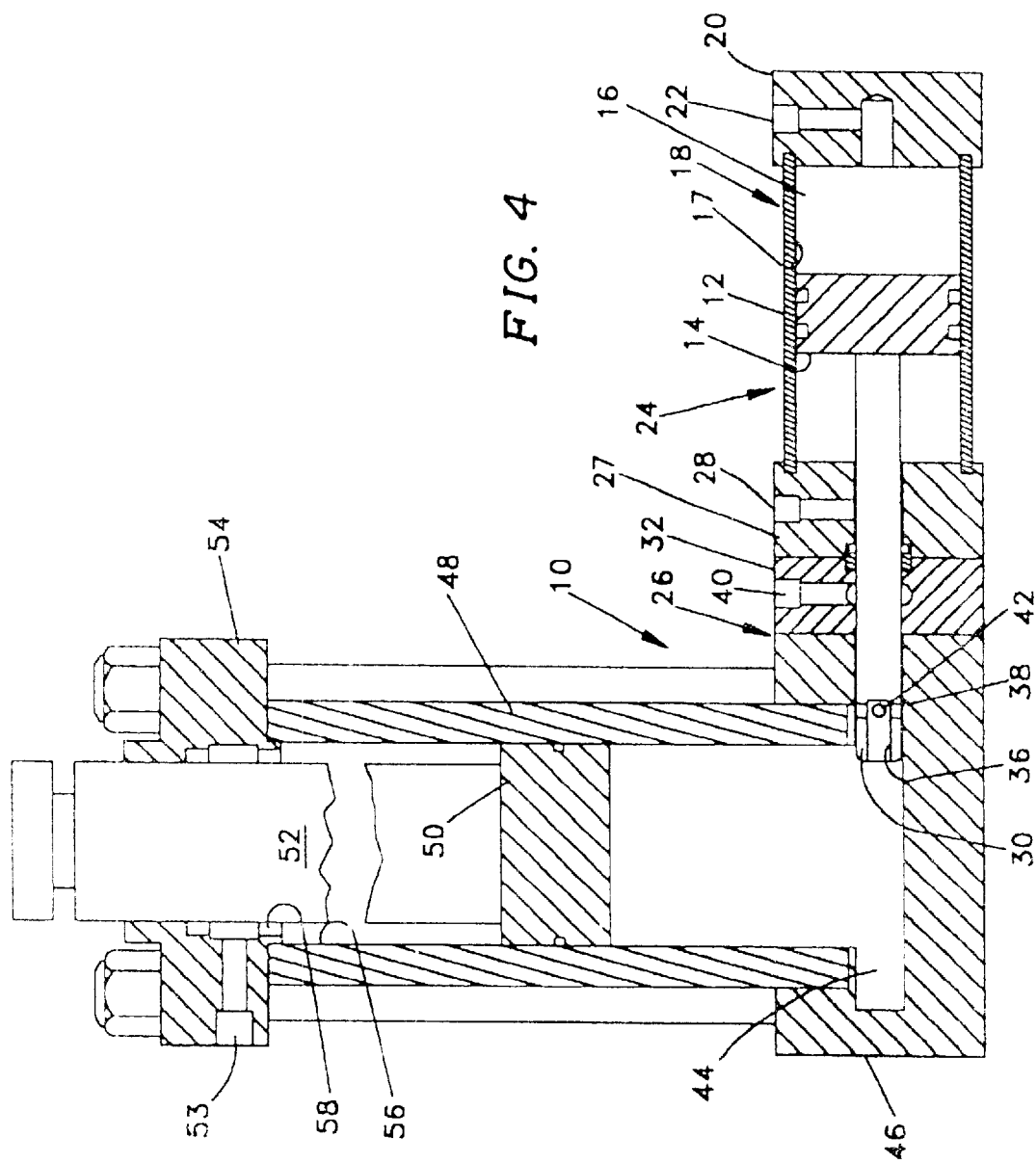

FIG. 4 is a view as in FIG. 3, but after actuation of a driving piston.

DETAILED DESCRIPTION OF THE PREFERRED EMBODIMENTS

The present invention is directed to a delayed triple pressure flow valve for a two work station system. In the figures a delayed triple pressure flow valve 60 is shown schematically in cross section. The rectangular block is approximately 3¾ inches long, 1⅞ inches wide and 1–2 inches thick. This block is made from drilled and tapped aluminum. Not all conduits and ball valves are in the same plane. An inlet port 62 feeds hydraulic fluid under pressure to a first conduit 64 which feeds the first work station through a second perpendicular conduit 66 and a first outlets 68. The distal end of the first conduit 64 connects via a smaller diameter third conduit 70 to a fourth conduit 72 having an intermediate diameter and a first ball valve 74 subject to a first compression spring 76 held by an aligned adjustable set screw 78 which adjusts the compressibility of the spring 76 and opening of the first ball valve 74 at approximately 1000–1500 psig. A first steel access plug 80 is provided for adjustment of the resistive force of the spring 76. The fourth conduit 72 has a perpendicular fifth conduit 82 of equal diameter.

A sixth conduit 86 having a smaller diameter commensurate with that of the third conduit 70 leads perpendicularly from the first conduit 64 and includes a second ball valve 88 at its juncture. A second compression spring 90 set to open the second ball valve 88 at greater than approximately 2000 psig is provided and accessed by a second non-adjustable steel plug 92 inserted in a seventh short conduit 94. The springs are made from suitable non-corrosive metal alloy.

The sixth conduit 86 leads to a seventh conduit 94 which leads to a third steel access plug 89. Access plugs 80 and 89 with hexagonal fittings are shown in the figures.

The seventh conduit 94 has an eighth conduit 98 joined perpendicularly at the junction of the fifth conduit 82 and aligned thereto. The eighth conduit 98 supplies hydraulic fluid to a second work station by a second outlet port 96. The first outlet port 68 and the second outlet port 96 are shown in the figures.

The flow mechanism for the delayed triple pressure flow valve device 60 begins with the hydraulic fluid entering the device via the inlet port 62 to flow through part of the first conduit 64 to the second conduit 66 and out the first outlet port 68 to the first work station. The hydraulic fluid is prevented from flowing into the second work station by virtue of the first ball valves 74 and the second ball valve 88. When the internal hydraulic fluid pressure rises to between 1000–1500 psig, the first ball valve 74 opens to allow the fluid to flow into the fourth conduit 72, the fifth conduit 82 and out the second outlet port 96 to the second work station. When cylinder in work station 2 reaches the end of the stroke, the operator will reverse operation thus returning fluid through port so ball 74 has conduit 70 blocked so fluid goes through ball 88 and out port 62.

It is to be understood that U.S. Pat. No. 6,012,287 is incorporated by reference in the present application.

Cylinder Extension

Fluid will come from the tank to the pump and into the joystick controlled manual valve. The operator will push the joystick to send fluid from the manual valve to "flow valve" 60 (FIG. 1 ) through port 62 to conduit 64 up through conduit 66 and out port 68 through a hydraulic hose to cylinder (FIG. 2). A hose attaches to port 92 and fluid will then proceed to race 38 (FIG. 3) through holes 42 to bore 36 in rod 30. Then fluid will proceed into bored 44 and raise piston 50 and rod 52 until the load becomes too great. At this point pressure will begin to increase. Back at FIG. 1 when pressure increases, to 2000 psig (for instance) ball 74 will push back against spring 76 and will allow fluid through conduit 70 to conduit 72 through conduit 82 and out port 96. A hydraulic line will carry fluid from port 96 to port 72 in (FIG. 2). As seen in FIG. 4 when fluid comes into port 72 it pushes piston 14 and rod 30 into bore 44. This action displaces pressurized fluid in bore 44 and fluid can not escape through port 40 because rod 30 has moved and shut it off. So as pressurized fluid gets displaced, pressure increases and pushes piston 50 and rod 52 up even further. When piston 14 stops at block 27, extension is complete.

Cylinder Retraction & Flow Valve Relief

To retract the cylinders an operator will pull the joystick and direct fluid through hose # 3 to port 53. As seen in FIG. 4 fluid will then go through bore 58 and 56 to push piston 50 and rod 52 back down. This action, pushes fluid back through port 44 which pushes rod 30 and piston 14 back through port 22 back through port 50 in the return direction. This action, pushes fluid back through port 22 through port 50 in (FIG. 2), to conduit 98 to conduit 86 out conduit 64, out port 62, back to the manual control valve (which will be open because it is in retract position), and then on to tank. When piston 14 in (FIG. 2 ) and rod 30 stop against block 20 holes 42 in rod 30 will be in line to release fluid in bore 44, through bore 36, through holes 42, through race 38, through port 40, through port 68 (FIG. 1) through conduit 66, through conduit 64, back to the manual control valve (which will be open because it is still in retract position), and then on to the tank. This retract cycle will last until piston 50 and rod 52 are in their retracted position.

It should be understood that reference to two work stations includes any two users of pressurized hydraulic fluid.

It is to be understood that the present invention is not limited to the embodiments described above, but encompasses any and all embodiments within the scope of the following claims.

I claim:

1. A delayed triple pressure flow valve device for two users of fluids comprising:

a rectangular block housing, an inlet port and a first conduit having a median portion and a distal portion; a second conduit perpendicularly connected to said first conduit at said median portion thereof and to a first outlet port; a third conduit connected to a fourth conduit in line with the first and fourth conduits; a fifth conduit perpendicularly connected to said fourth conduit; a sixth conduit perpendicularly connected to said first conduit proximate to said distal end thereof; a seventh conduit connected perpendicularly to said sixth conduit and having a median portion and a distal end; an eighth conduit connected perpendicularly to said seventh conduit and adjacent to said fifth conduit; said fourth conduit containing a first valve motivated by a first compression spring to close off the third conduit; and said distal end of the first conduit containing a second valve motivated by a second compression spring to close off the sixth conduit;

whereby the two users of the fluids under pressure can obtain pressure in sequence by virtue of the delayed triple pressure flow valve device and excessive fluid pressure can be blocked by the switch block device.

2. The flow valve according to claim 1, including a set screw positioned in the fourth conduit of the delayed triple pressure flow valve device for adjustment of fluid overpressure by adjusting the tension of the first compression spring to permit fluid flow from the third conduit to the fifth conduit to a second user when a predetermined first pressure is exceeded.

3. The flow valve according to claim 1, including a first access plug in the delayed triple pressure flow valve device for accessing the set screw for adjustment of the tension of the first compression spring.

4. The flow valve according to claim 1, including the release of excessive predetermined fluid pressure on the first ball valve in the delayed triple pressure flow valve device by opening the second, ball valve at a predetermined higher fluid pressure to direct the fluid flow through the sixth, seventh and eighth conduit and to the second user.

5. The flow valve according to claim 1, including a second access plug connected to the second spring in the delayed triple pressure flow valve device.

6. The flow valve according to claim 1, including a third plug connected to and closing the seventh conduit in the delayed triple pressure flow valve device.

7. The flow valve according to claim 1, including the movement of the piston by excessive fluid pressure in the delayed triple pressure flow valve device to open the second exit port and block the second tank relief port.

8. The flow valve system according to claim 1, including the movement of the piston by excessive fluid pressure in the delayed triple pressure flow valve device to block the second switch port.

9. A triple pressure flow valve device comprising:

a rectangular block housing, an inlet port and a first conduit having a median portion and a distal portion; a second conduit perpendicularly connected to said first conduit at said median portion thereof and to a first outlet port; a third conduit connected to a fourth conduit in line with the first and fourth conduits; a fifth conduit perpendicularly connected to said fourth conduit; a sixth conduit perpendicularly connected to said first conduit proximate to said distal end thereof; a seventh conduit connected perpendicularly to said sixth conduit and having a median portion and a distal end; an eighth conduit connected perpendicularly to said seventh conduit and adjacent to said fifth conduit; said fourth conduit containing a first valve motivated by a first compression spring to close off the third conduit; and said distal end of the first conduit containing a second valve motivated by a second compression spring to close off the sixth conduit.

* * * * *